(12) United States Patent
Nelson et al.

(10) Patent No.: US 9,194,556 B1
(45) Date of Patent: Nov. 24, 2015

(54) METHOD OF PRODUCING LED LIGHTING APPARATUS AND APPARATUS PRODUCED THEREBY

(71) Applicants: Theodore G. Nelson, Portland, OR (US); David Koskela, Eureka, CA (US)

(72) Inventors: Theodore G. Nelson, Portland, OR (US); David Koskela, Eureka, CA (US)

(73) Assignee: Theodore G. Nelson, Portland, OR (US)

( * ) Notice: Subject to any disclaimer, the term of this patent is extended or adjusted under 35 U.S.C. 154(b) by 0 days.

(21) Appl. No.: 13/774,941

(22) Filed: Feb. 22, 2013

Related U.S. Application Data

(60) Provisional application No. 61/601,941, filed on Feb. 22, 2012, provisional application No. 61/614,298, filed on Mar. 22, 2012.

(51) Int. Cl.
| | | |
|---|---|---|
| *F21V 1/00* | (2006.01) | |
| *F21V 9/00* | (2015.01) | |
| *F21V 3/00* | (2015.01) | |
| *F21K 99/00* | (2010.01) | |

(52) U.S. Cl.
CPC .... *F21V 3/00* (2013.01); *F21K 9/90* (2013.01)

(58) Field of Classification Search
CPC ......... H05K 1/028; H05K 1/119; F21K 9/135
USPC ........................................................ 362/235
See application file for complete search history.

(56) References Cited

U.S. PATENT DOCUMENTS

| | | |
|---|---|---|
| D344,605 S | 2/1994 | Aspenwall |
| 5,475,241 A | 12/1995 | Harrah et al. |
| 5,775,459 A | 7/1998 | Jorg et al. |
| 6,045,240 A | 4/2000 | Hochstein |
| D434,175 S | 11/2000 | Fahmian |
| 6,183,100 B1 | 2/2001 | Suckow et al. |
| 6,354,714 B1 | 3/2002 | Rhodes |
| 6,371,636 B1 | 4/2002 | Wesson |
| 6,441,943 B1 | 8/2002 | Roberts et al. |
| 6,465,961 B1 | 10/2002 | Cao |
| 6,601,976 B1 | 8/2003 | Rhee |
| 6,659,632 B2 | 12/2003 | Chen |
| 6,812,970 B1 | 11/2004 | McBride |

(Continued)

OTHER PUBLICATIONS

Ming-Hei Chu, Grantham Kwok-Hung Pang, "Solder Paste Inspection by Special LED Lighting for SMT Manufacturing of Printed Circuit Boards," Intelligent Manufacturing Systems, 8th IFAC International Workshop on Intelligent Manufacturing Systems, University of Alicante, Spain, May 23-25, 2007, pp. 222-226, vol. 8, Part 1.

(Continued)

*Primary Examiner* — Tracie Y Green
(74) *Attorney, Agent, or Firm* — Marger Johnson

(57) ABSTRACT

Disclosed is an LED bulb having many advantages over previous bulbs. The bulb is designed with ease of fabrication and low cost in mind. A main support is made of chromed copper, used for both its reflectivity, its readily availability, and its relative low cost. A collection of bright LEDs are electrically coupled to a driving circuit formed on a board that is housed within the main support. The LEDs are mounted on a circuit board flexible enough to form into a desired shape while rigid enough to withstand normal movements. The LED circuit board includes multiple polished or shiny areas, also called lands or panels made to reflect light away from the bulb. The panels are electrically insulated from the operating circuit and prevent injury should the bulb be broken and the components be touched, even while operating.

13 Claims, 5 Drawing Sheets

(56) References Cited

U.S. PATENT DOCUMENTS

| | | | |
|---|---|---|---|
| D508,575 S | 8/2005 | Buschmann et al. | |
| 6,982,518 B2 | 1/2006 | Chou et al. | |
| 6,997,576 B1 | 2/2006 | Lodhie et al. | |
| 7,014,336 B1 | 3/2006 | Ducharme et al. | |
| 7,038,399 B2 | 5/2006 | Lys et al. | |
| D528,227 S | 9/2006 | Chou et al. | |
| 7,102,902 B1 | 9/2006 | Brown et al. | |
| D531,741 S | 11/2006 | Takahashi | |
| 7,152,997 B1 | 12/2006 | Kovacik et al. | |
| D534,665 S | 1/2007 | Egawa et al. | |
| D538,953 S | 3/2007 | Mama | |
| D541,440 S | 4/2007 | Feit | |
| D545,477 S | 6/2007 | DeBruyne et al. | |
| 7,255,457 B2 | 8/2007 | DuCharme et al. | |
| D553,267 S | 10/2007 | Yuen | |
| 7,352,138 B2 | 4/2008 | Lys et al. | |
| D572,400 S | 7/2008 | Benensohn | |
| 7,396,149 B2 | 7/2008 | Dicken | |
| D584,444 S | 1/2009 | Lipson | |
| D584,844 S | 1/2009 | Ghini | |
| 7,494,241 B2 | 2/2009 | McCarthy et al. | |
| D590,523 S | 4/2009 | Takahashi | |
| 7,556,406 B2 | 7/2009 | Petroski et al. | |
| 7,677,768 B2 | 3/2010 | Huang et al. | |
| 7,692,206 B2 | 4/2010 | Loh | |
| 7,744,250 B2 | 6/2010 | Lee et al. | |
| 7,841,741 B2 | 11/2010 | Chan et al. | |
| 7,906,794 B2 | 3/2011 | Harrah et al. | |
| 7,918,582 B2 | 4/2011 | Curran et al. | |
| 7,938,562 B2 | 5/2011 | Ivey et al. | |
| 7,942,556 B2 | 5/2011 | Harbers et al. | |
| 7,946,729 B2 | 5/2011 | Ivey et al. | |
| 7,959,327 B2 | 6/2011 | Lai et al. | |
| 7,976,196 B2 | 7/2011 | Ivey et al. | |
| 8,033,683 B2 | 10/2011 | Fields | |
| 8,067,881 B2 | 11/2011 | Kazmierski | |
| 8,098,003 B2 * | 1/2012 | Morikawa et al. | 313/113 |
| 8,253,344 B2 | 8/2012 | Guest et al. | |
| 2003/0127994 A1 | 7/2003 | Patchornik et al. | |
| 2004/0114367 A1 | 6/2004 | Li | |
| 2005/0253533 A1 | 11/2005 | Lys et al. | |
| 2007/0103086 A1 | 5/2007 | Neudorf et al. | |
| 2007/0127235 A1 | 6/2007 | Cooper et al. | |
| 2007/0267984 A1 | 11/2007 | Peng | |
| 2007/0279903 A1 | 12/2007 | Negley et al. | |
| 2008/0298058 A1 | 12/2008 | Kan et al. | |
| 2009/0003009 A1 | 1/2009 | Tessnow et al. | |
| 2009/0026982 A1 * | 1/2009 | Lee et al. | 315/312 |
| 2009/0175041 A1 | 7/2009 | Yuen et al. | |
| 2009/0213583 A1 | 8/2009 | Chang et al. | |
| 2009/0294782 A1 | 12/2009 | Peng | |
| 2010/0002466 A1 | 1/2010 | Kim et al. | |
| 2010/0156325 A1 | 6/2010 | Nelson | |
| 2010/0207502 A1 * | 8/2010 | Cao et al. | 313/46 |
| 2010/0207534 A1 | 8/2010 | Dowling et al. | |
| 2010/0295439 A1 | 11/2010 | Oechsle et al. | |
| 2011/0037409 A1 | 2/2011 | Van De Ven et al. | |
| 2011/0049559 A1 | 3/2011 | Yen | |
| 2011/0149563 A1 | 6/2011 | Hsia et al. | |
| 2011/0176297 A1 | 7/2011 | Hsia et al. | |
| 2011/0204778 A1 | 8/2011 | Sadwick et al. | |
| 2011/0234078 A1 | 9/2011 | Choi et al. | |
| 2011/0248619 A1 | 10/2011 | Loh | |
| 2011/0260599 A1 | 10/2011 | Qiu | |
| 2011/0298371 A1 * | 12/2011 | Brandes et al. | 315/32 |
| 2011/0299292 A1 * | 12/2011 | Preuschl | 362/382 |
| 2012/0032574 A1 * | 2/2012 | Lin et al. | 313/46 |
| 2012/0106153 A1 * | 5/2012 | Huang et al. | 362/249.02 |
| 2012/0170262 A1 * | 7/2012 | Hoetzl et al. | 362/227 |
| 2012/0287614 A1 * | 11/2012 | Kajiya et al. | 362/184 |
| 2013/0010463 A1 * | 1/2013 | Li et al. | 362/235 |

OTHER PUBLICATIONS

Paul C.-P. Chao, Lun-De Liao, Chi-Wei Chiu, "Design of a Novel LED Lens Cap and Optimization of LED Placement in a Large Area Direct Backlight for LCD-TVs," SPIE Proceedings vol. 6196, Photonics in Multimedia, Apr. 21, 2006, 9 pages.

Jinbo Jiang, Sandy To, W.B. Lee, Benny Cheung, "Optical Design of a Freeform TIR Lens for LED Streetlight," Optik—International Journal for Light and Electron Optics, pp. 1761-1765, Oct. 2010, vol. 121, Issue 19.

Wilson, S., "New Perspectives on Packaging Surface-Mount LEDs," Electronic Engineering—London, Nov. 1996, p. 71, vol. 68, No. 839.

* cited by examiner

Before Shaping

After Shaping

METHOD OF PRODUCING LED LIGHTING APPARATUS AND APPARATUS PRODUCED THEREBY

CROSS REFERENCE TO RELATED APPLICATIONS

This disclosure claims benefit of U.S. provisional application 61/601,941, filed Feb. 22, 2012, entitled METHOD OF PRODUCING LED LIGHTING APPARATUS AND APPARATUS PRODUCED THEREBY, and claims benefit of U.S. provisional application 61/614,298, filed Mar. 22, 2012 entitled DRIVING CIRCUIT FOR LIGHT EMITTING DIODE APPARATUS AND METHOD OF OPERATION, the contents of both of which are incorporated by reference herein. Additionally this disclosure is related to US non-provisional patent application entitled DRIVING CIRCUIT FOR LIGHT EMITTING DIODE APPARATUS AND METHOD OF OPERATION, filed on even date herewith Ser. No. 13/774,915, which is incorporated by reference herein.

FIELD OF THE INVENTION

This disclosure is directed to lighting, and, more particularly, to a new Light Emitting Diode (LED) lighting apparatus and a method to make such an apparatus.

BACKGROUND

Light Emitting Diodes (LEDs) are specialized diodes made from semiconductor material or materials. LEDs differ from standard diodes in that, when LEDs are energized by small amounts of electric current, they emit light that is visible to humans. Early generation LEDs generated primarily red, yellow, or green colored lights, but relatively recent advances in LED technology provide blue and white LED lights as well. White LEDs may be particularly bright, and, because they are made of a stable, solid state material, have a very long working lifetime. Additionally, LEDs operate at relatively low voltage, and their electrical current requirements are decreasing as LED technology matures.

LEDs have found their way into a variety of lights previously served by incandescent, florescent, or other lighting technology. For instance, LEDs may be found in taillights of many vehicles, such as automobiles and trucks. They also have found niche use in flashlights as well. LEDs have not been as successful making inroads into home or industrial lighting; however, primarily due to their relative high cost compared to the very mature standard incandescent bulb, which has been available for at least 50 years, and is very cost-efficiently made. Even the latest florescent bulbs, known as Compact Florescent Lights (CFL), have been available in the United States for approximately 15 years, and are thus a mature technology when compared to LED lighting. Maturity brings with it lower fabrication cost and increased consumer awareness, both of which combine to create a product having large consumer following and sales. Present LED light bulbs are currently too expensive to fabricate and operate to favorably compete in the residential and industrial lighting market.

Embodiments of the invention address this and other limitations of the prior art.

DETAILED DESCRIPTION

Figure 1:
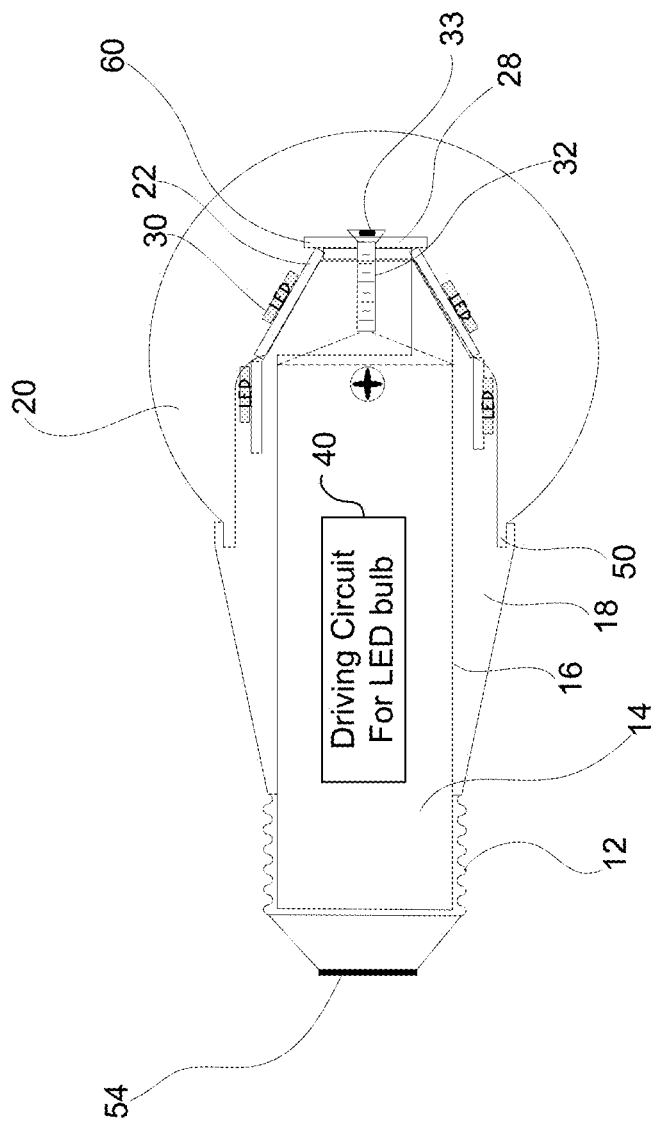
FIG. 1 is a side view of an LED bulb according to embodiments of the invention.

FIG. 1 is a side view of an LED bulb 10 according to embodiments of the invention. In general, the LED bulb 10 has a bulb shape, with the larger end containing a number of LED devices, and the smaller end used for inserting the bulb 10 into a standard electrical socket to provide power for the bulb.

A base 12, such as a standard Edison screw 12, includes threads to mate with a standard 120-volt lamp socket (not shown), although other sockets or voltages may be used as well, depending on local standards. As illustrated in FIGS. 1 and 2A. A support body 16 within the bulb 10, which may be tubular shaped, has a multitude of uses. In some embodiments, the support 16 may be made of metal, which may be used to conduct electricity from the base 12 to a driving circuit, described below. The metal for the support body 16 may be, for instance, chromed copper with a diameter of ¾ inch. Not only is copper an excellent conductor of heat, which is useful for carrying heat away from the LED devices, but also chroming the surface of the support 16 has the added benefit of reflecting light from the LED devices, increasing the overall efficiency of the LED bulb. The support 16 may be shaped to interface with the base 12, such as by forming or turning a number of threaded ridges into the support. Before turning, an additional layer may be added to the support. For instance, a thicker piece of copper 13 may be attached on the outside of the support 16 at the base end of the support, and the turnings made in this thicker piece of copper. Other ways of creating a threaded portion for the support 16 may be used as well. The support 16 may also function as a shield for ElectroMagnetic Interference (EMI) that may be generated by the driving circuit for the LED bulb 10.

A circuit board 14, hereinafter called the main board 14, may be conveniently partially or fully contained within the support 16. The main board 14 supports circuitry 40 used to convert the energy supplied from the socket (not shown) into which the bulb 10 is inserted, as described below.

Partially surrounding the support body 16 is a portion of body plastic 18, which is preferably clear so that light reflected from the chromed metal support body 16 may be reflected away from the LED bulb 10, increasing the efficiency of the bulb. As described below, the overall shape of the body plastic 18 allows some of a series of LEDs mounted over the body plastic to shine downward, toward the base 12 of the bulb 10. Differently than other LED bulbs, heat fins are not required on LED bulbs as illustrated in FIG. 1. The absence of heat fins allows much more light to reflect from body of the bulb, because no fins are present to block or diffuse the light.

The body plastic 18 includes a recess 50 structured to receive an edge or lip of a bulb cover 20. The bulb cover 20 is preferably glass, although other materials such as plastic may also be used. The recess structure 50 of the body plastic 18 may use friction or a mechanical lip to hold the cover 20 in place, or other methods may be used, such as glue. In other embodiments the bulb cover 20 threads into the recess structure 50.

Figure 2B:
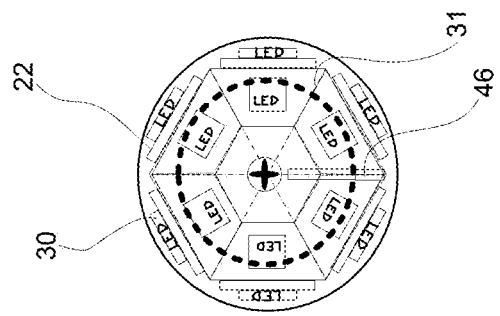
FIG. 2B is a top view of an LED configuration according to embodiments of the invention.
Figure 2A:
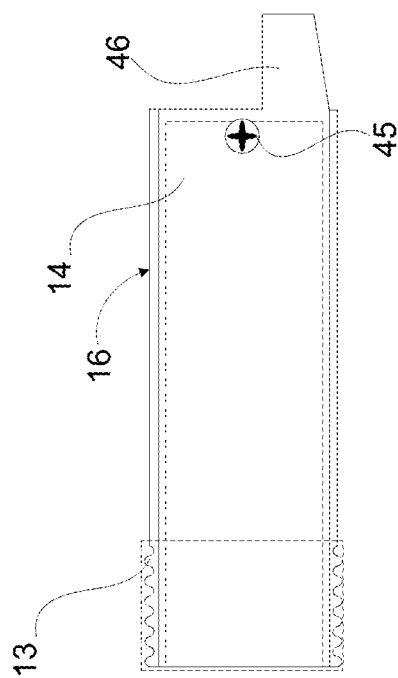
FIG. 2A is a side view of a support tube housing a circuit board for a driving circuit of the LED bulb of FIG. 1 according to embodiments.

As illustrated in FIGS. 1 and 2B, the bulb cover 20 covers a circuit board 22 used for supporting a number of individual LED devices 30 in the bulb 10. The LED devices 30 are the light-generating portion of the LED bulb 10. In one embodiment, the LED devices are approximately 0.2 inches square, and manufactured by Nichia of Japan.

Figure 3:
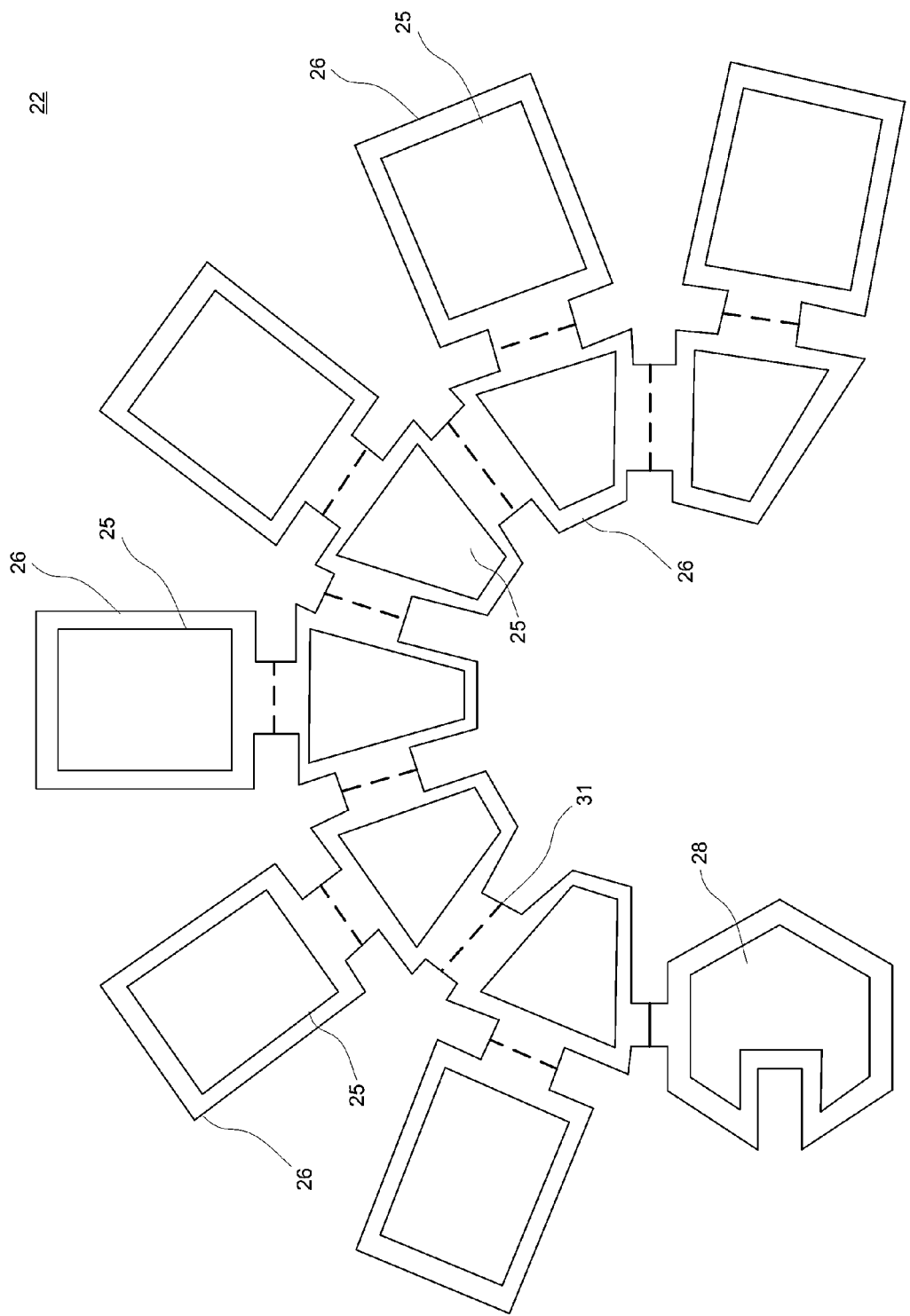
FIG. 3 is a diagram illustrating a series of panels of a printed circuit board used for constructing the LED bulb of FIG. 1, according to embodiments of the invention.

As illustrated in outline in FIG. 3, the circuit board 22 on which the LED devices 30 are placed is referred to herein as the LED board. In the embodiment illustrated, the LED board 22 includes twelve individual panels or panels 26 on which one of the individual LED devices 30 is placed. Circuit areas 25 are located within the panels 26 and provide electrical connection (not shown) between the individual LED devices 30 and the driving circuit 40, described above. Of course, more or fewer than twelve panels 26 may be used on other embodiments.

As illustrated, there are six panels 26 having a generally rectangular shape and six panels having a generally trapezoidal shape. Each individual panel 26 is separated by a fold zone 31, the function of which is described below. A separate panel 28 may be differently shaped from the others. As illustrated in FIGS. 1 and 2B, the panel 28 may be secured to the top of the circuit board 22 after it has been formed into a dome shape during production of the bulb 10. The panel 28 may be made from the same blank as the circuit board 22, or may be fabricated separately. In other embodiments, each individual panel 26 may be individually made, although there are benefits to having them made together, as described below.

Figure 4A:
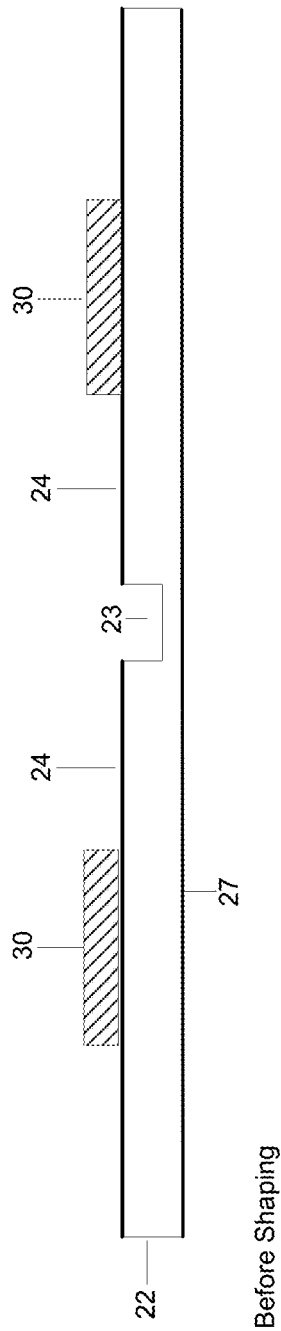
FIGS. 4A and 4B are block diagrams illustrating steps of fabrication and partial shaping for an LED printed circuit board according to embodiments of the invention.
Figure 4B:
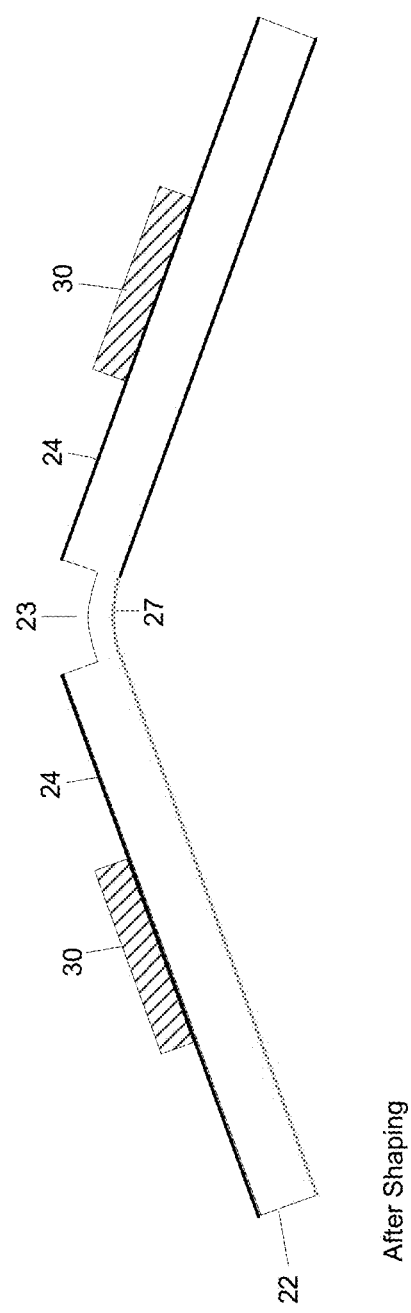

As illustrated in FIGS. 4A and 4B, the circuit board 22 is first produced in a planar shape. Later, after the LED devices 30 have been installed on the circuit board 22, the circuit board is treated so that it may be shaped into its final form for installation in the bulb 10. In other embodiments the circuit board 22 may be shaped before the LED devices 30 are secured thereon.

In FIGS. 4A and 4B the circuit board 22 is a two-layer printed circuit board with electrical traces on the top and bottom of the board 22. In other embodiments boards having more or fewer layers could be used.

In detail, FIG. 4A illustrates a first state of the circuit board 22. The circuit board 22 has an upper layer of conductive material, which may be tin-covered copper, illustrated as surfaces 24. The function of surface 24 is at least two-fold. First, the surface 24, because it is a shiny metal, tends to reflect light from the LED devices 30 placed on it. Secondly, because metal has a high rate of thermal conductivity (heat transfer), surface 24 is used as a heat sink, structured to carry heat away from the LED devices 30. As described below, the metal surface 24 is not necessarily connected to any electrical portion of the bulb 10. Instead, the surface 24 may be insulated from the driving circuitry. One benefit of such a configuration is that this prevents any potential for electrical shock should the bulb cover 20 ever break and the components covered by the bulb cover 20 become exposed.

A bottom layer 27 of the LED board 22 includes traces, such as copper traces used to deliver the signal generated by the main board 14 to the LED devices 30 themselves. An example of the bottom layer 27 of an example LED board 22 is illustrated in FIG. 3A. Generally, the bottom layer 27 is also made of copper, or tin plated copper. The copper layer 27 is thick enough so that it may be bent without breaking, as described below. The bottom layer 27 provides an electrical path for the main board 14 to power all of the LED devices 30, as described below.

Referring back to FIG. 4A, in production, the LED devices 30 may be placed on the circuit board 22 or into through-holes in the LED board 22 (not shown) by manual or mechanical means. Presently, cost-effective high-volume production is typically performed by a pick and place machine, and this design supports such production.

In one embodiment, after the LED devices 30 are placed on the LED board 22, they are connected by through-hole plating to the bottom layer 27, thereby allowing them to be in electrical contact with the driving circuitry 40 on the main board 14. Next, a groove 23 is formed in the LED board 22 along the fold zones 31 (FIG. 3), weakening the board in the grooved areas. Generally, the groove is formed between the panels 26. The groove 23 may be formed in a number of ways. For instance, the groove may be plunge routed, or formed with a milling machine that can perform X,Y,Z routing.

As illustrated in FIGS. 3 and 4A, the LED board 22 begins as a flat, semi-circular piece of circuit board. A milling machine may cut the individual panels 26 in the LED board 22 by cutting the outer shape of the LED board. This step may take place near the time when grooves 23 between the individual faces are routed, as described with reference to FIG. 2B. Alternatively, the grooves may be made later. The difference is that, to cut out the outline shape for the LED board 22, the cutting head cuts all the way through the circuit board material, while the cutting head cutting the groove 23 only cuts partially through the circuit board material. In one embodiment, the cutting head cuts out the general shape of the LED board 22, then cuts grooves 23 between the individual panels 26.

After the LED board 22 is cut to shape and grooves 23 are formed, the LED board 22 may be shaped for placement into the bulb 10. First, the panel 28 that will be the top of the bulb 10 is bent to align the top portion of the LED board 22 with a hole 32 in the body plastic 18 (FIG. 1). Then, each of the individual panels 26 of the LED board 22 in the same horizontal row are bent 60 degrees from one another, to form a generally "bullet" or dome shaped LED board, as illustrated in FIG. 1. The bending of the LED board 22 may be guided by mating or receiving surfaces on the body plastic 18, generally forming an elongated six-sided shape, with twelve panels 26 each including a respective LED device 30. In embodiments having different number of panels 26 for the LEDs 30, the number of receiving surfaces on the body plastic 18 would also be different so as to receive the panels 26.

Figure 5:
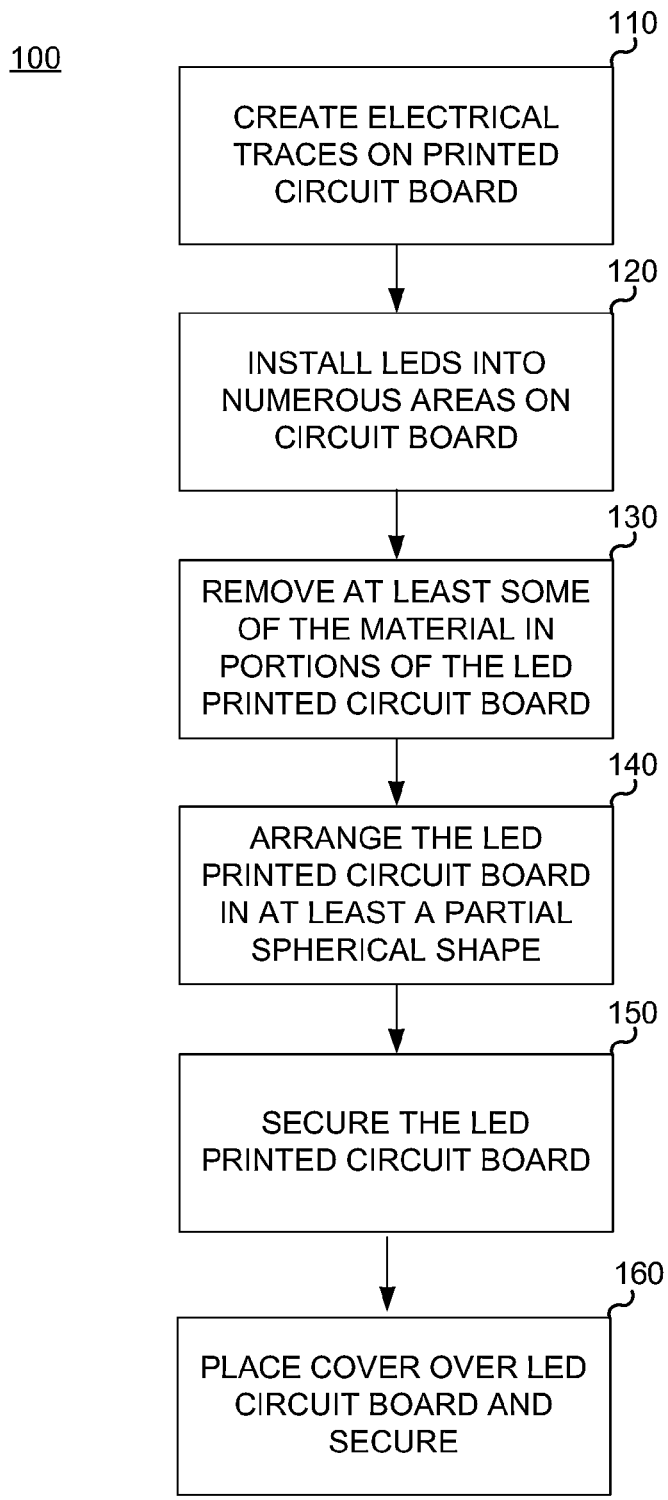
FIG. 5 is a flow diagram of an example method used to create the LED bulb of FIG. 1 according to embodiments of the invention.

The LED bulb 10 may be assembled in a straightforward manner, which keeps production costs low. Many of these steps and ones in the previous section are illustrated in FIG. 5.

According to some methods of assembly, first, the metal support body 16 is inserted into the body plastic 18, which is shaped to receive it. The main board 14, which has the driving circuitry 40 formed thereon, is inserted into the metal support body 16. The main board 14 includes a tab 46 (FIG. 1), which is used to provide a mechanical and electrical connection to the LED board 22. The circuit board 14 is aligned to its position, and a securing means, such as a screw 45, is used to attach the circuit board to the body plastic 18.

Next, and after the LED board 22 has had its LED devices 30 installed thereon and the grooves 23 are formed, the main board 14 is electrically connected to the LED board. In one embodiment the driving circuit 40 includes two terminations, which are electrically coupled, for example by wire, to two terminations in the LED board 22, respectively. The terminations may be labeled for clarity.

Next, the LED board 22, now shaped, is set on the mating portions of the body plastic 18, and aligned with the tab 46, as shown in FIG. 2B. A temporary screw may hold the LED board 22 in place while solder pads on the tab 46 of the main board 14 are soldered to receiving areas of the LED board 22, thereby establishing an electrical connection between the driving circuitry 40 on the main board 14 and the LED devices 30 of the LED board 22.

In other embodiments, this top board that includes panel 28 includes a hole to receive the screw 33, which is tightened to hold the top board against the LED board 22. The LED board 22, in turn, is held fast to the body plastic 18 by the force of the screw. In most embodiments the third board has no electrical connections but may be covered with a reflective surface, such as tin.

Next the base Edison socket 12 is attached to the metal support body 16, such as by screwing the socket onto the ridges of the metal support body. Then the Edison socket 12 is soldered to a wire connecting the socket to the driving circuit 40 on the main board 14. Excess solder may be removed by trimming or sanding, for instance. Finally, the cover 20, which may be made of glass or clear plastic is inserted into the recess 50 of the body plastic. The cover 20 may be secured by gluing, for instance, then trimmed as a finishing step.

One of the features of the LED bulb 10 according to embodiments of the invention is its ability to prevent electrical shocks. First, when the LED bulb 10 is fully assembled, i.e., the bulb cover 20 is attached to the body plastic 18, then none of the electrical components within the LED bulb are capable of being touched because they are covered with either a plastic or glass insulator. However, even when the bulb cover 20 is not present, for instance if the bulb cover is made of glass and the glass breaks, no electrical components are exposed. More particularly, the LED devices 30 on the LED board 22 are all coupled using through-holes to the underside of the LED board. Since the LED devices 30 cover the through holes in the LED board 22, there is no possibility of touching the electrical circuit that drives the LED devices. The circuit made by the bottom layer 27 of the LED board 22 (FIGS. 4A and 4B) is physically covered by the LED board 22 itself. The bottom layer 27 is also effectively insulated by being placed against the previously shaped body plastic 18. Even further, the driving circuitry 40 on the main board 14 is fully surrounded by the support 16, which is yet further surrounded by the body plastic 18. This further prevents the driving circuitry from being touched even if the bulb cover 20 is not present on the LED bulb 10.

What is claimed is:

1. A method of forming a bulb comprising a plurality of Light Emitting Diodes (LEDs), the method comprising:
    forming a printed circuit board including a plurality of LED panels having electrical connections therebetween;
    mounting the plurality of LED devices, respectively, to the plurality of panels;
    bending the printed circuit board into a three-dimensional shape;
    inserting a main driving circuit within a longitudinal support;
    coupling the main driving circuit to the printed circuit board through a tab extending from the main driving circuit;
    aligning the printed circuit board to the tab;
    mechanically supporting the printed circuit board with the tab; and
    mounting the shaped printed circuit board and the longitudinal support into the bulb.

2. The method of forming a bulb comprising a plurality of LED devices according to claim 1, further comprising:
    pre-weakening the printed circuit board at defined areas between the plurality of panels.

3. The method of forming a bulb comprising a plurality of LED devices according to claim 2, in which pre-weakening the printed circuit board at defined areas between the plurality of panels comprises forming grooves in the printed circuit broad, the grooves extending partially through a thickness of the printed circuit board.

4. The method of forming a bulb comprising a plurality of LED devices according to claim 1, further comprising:
    placing the shaped printed circuit board into a receiver including a plurality of receiving portions structured to receive at least some of the plurality of panels.

5. The method of forming a bulb comprising a plurality of LED devices according to claim 4, further comprising:
    securing the shaped printed circuit board to the receiver.

6. The method of forming a bulb comprising a plurality of LED devices according to claim 1, further comprising:
    providing a receiver for the shaped printed circuit board and the longitudinal support; and
    securing the shaped printed circuit board to the receiver.

7. The method of forming a bulb comprising a plurality of LED devices according to claim 6, further comprising:
    securing a bulb that covers the shaped printed circuit board to the receiver.

8. A light bulb including a plurality of Light Emitting Diodes (LEDs), comprising:
    a driving circuit board;
    a longitudinal support structured to receive the driving circuit board;
    a board support structured to engage the longitudinal support;
    a generally dome-shaped printed circuit board having a plurality of LEDs mounted thereon and coupled to the board support, the dome-shaped printed circuit board including a number of individual LED panels structured to support individual ones of the LEDs, and the individual panels connected to one another through at least one circuit trace on the printed circuit board, the dome-shaped printed circuit board further including weakening grooves between the individual panels and partially through a thickness of the dome-shaped printed circuit;
    an electrical connection at a first end of the bulb; and
    a cover at a second end opposite the first end of the bulb, the cover structured to cover the dome-shaped printed circuit board.

9. The light bulb including a plurality of LEDs according to claim 8, in which the board support is made of plastic and has a plurality of receiving areas structured to receive the individual panels of the printed circuit board.

10. The light bulb including a plurality of LEDs according to claim 8, further comprising:
    a component structured to electrically couple the light bulb to a lamp socket.

11. The light bulb including a plurality of LEDs according to claim 8, in which the printed circuit board comprises twelve individual panels.

12. The light bulb including a plurality of LEDs according to claim 8, in which an outer surface of the panels are electrically isolated from driving circuitry of the bulb.

13. The light bulb including a plurality of LEDs according to claim 12, in which the outer surface of the panels is reflective.

* * * * *